Figure 1:
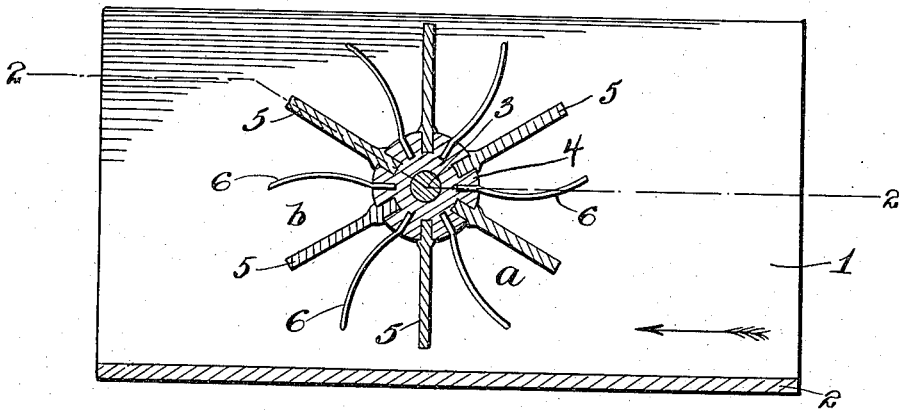

J. H. DREHER.
FISH STOP.
APPLICATION FILED OCT. 27, 1913.

1,150,348.

Patented Aug. 17, 1915.

UNITED STATES PATENT OFFICE.

JULIUS H. DREHER, OF DETROIT, MICHIGAN.

FISH-STOP.

1,150,348.  Specification of Letters Patent.  Patented Aug. 17, 1915.

Application filed October 27, 1913. Serial No. 797,477.

*To all whom it may concern:*

Be it known that I, JULIUS HENRY DREHER, a citizen of the United States, residing at Detroit, in the county of Wayne and State of Michigan, have invented certain new and useful Improvements in Fish-Stops, of which the following is a specification.

It is one of the objects of my invention to provide a rotatable fish stop adapted for use in flumes or other passage ways or conduits in which a fish stop may be desirable or necessary, and it is one of the features of my invention to provide a fish stop which will not only frighten the fish from passing beyond the stop but which will also eliminate obstruction by aggregations or collections of debris as a result of the interposition of the fish stop in the stream.

Fish stops comprising rotatable structures which are peripherally screened, have been interposed in a stream with the object of relying upon a practically continuous perforated obstructed surface for preventing fish from passing beyond the stop. Some of these forms of fish stops have been constructed to rotate in the direction of flow of the stream and others contrary to the direction of flow but it has been found that where a continuous perforate structure is interposed in a stream, collections of debris result in such a manner as to objectionably clog and impair free operation of the stop where the same is driven by the current. When a fish stop is brought to a position of rest, or where its rotation or operation is reduced in speed by collections of debris or otherwise, the fish stop practically fails to perform its function and the fish no longer fear to pass it. In prior constructions, it has been contemplated that the debris would pass over the top or beneath the rotating body, but in either case, when a collection of debris has clogged operation of the fish stop the stream is dammed with the result that fish can readily pass over the stop.

It is one of the objects of my invention to provide a rotor to which rotation is imparted by the current in which it is interposed, and on which projecting elements are arranged so that there will be a continuous movement of said projecting elements extending throughout the cross sectional area of the conduit so as to frighten fish against any attempt to pass beyond the stop.

A further feature is to provide freely and openly projecting elements so that when they are engaged by debris passing down with the water, such engagement will be laterally of the longitudinal axes of said projections thereby offering no resistance to passage of the debris through the stop because of release of the debris by such projections when the latter attain an aft position, with respect to the stop.

A further object is to provide a rotor fish stop which will be propelled by the current without any motors or other devices driven by the current, and which will rotate in the direction of the current instead of contrariwise with respect thereto.

Further objects and features of the invention will be more fully described in connection with the accompanying drawing and will be more particularly pointed out and ascertained in and by the appended claim.

Figure 2:
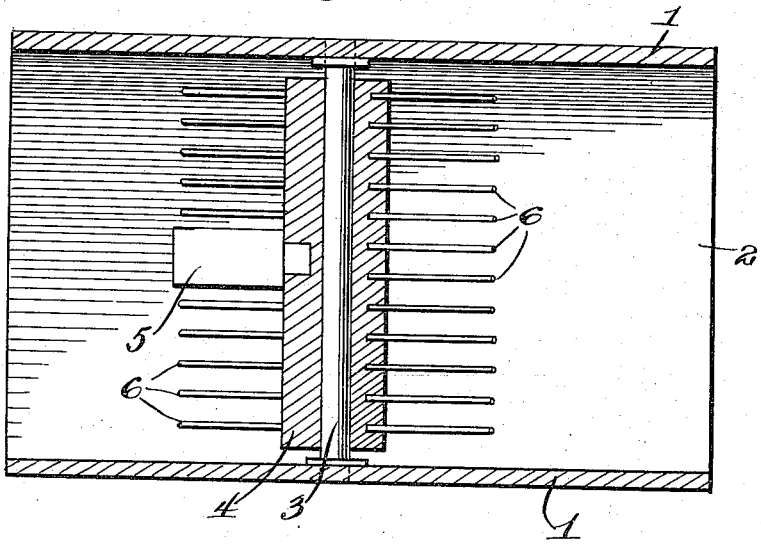

In the drawing:—Figure 1 is a longitudinal sectional view of a conduit or flume in which a fish stop embodying one form of my invention is mounted or interposed. Fig. 2 is a sectional view on line 2—2 of Fig. 1.

Like characters of reference designate similar parts throughout the different figures of the drawing.

In the particular form shown, a conduit or flume is provided having parallel side walls 1 and a bottom wall 2. The direction of current is indicated by the arrow in Fig. 1. However, I do not wish to be limited to a supporting means of the form shown, for positioning my improved stop in a stream.

The particular form of stop involves a shaft 3, which is suitably journaled in the side wall 1, and on which is mounted a hub 4 which extends substantially completely across the channel through which the current of the stream passes.

The improved fish stop, which may be termed a rotor, as a whole, is preferably located at such depth in the stream that the normal water level will be approximately at the center of rotation, or will coincide with the axis of the shaft 3.

A plurality of paddles 5 radiate outwardly from the hub 4 to which they are attached and they are shown in such spaced relation, circumferentially, that a considerable immersion of one will be effected before the following paddle splashes into the water.

The paddles function not only to impart rotary movement to the rotor stop but to also create a very material disturbance in their passage through the water, especially at their entrance into the water, so as to effectively frighten the fish not only against any attempt to pass through or beneath the stop but against any inclination to approach the stop. Thus by keeping the fishes at a distance from the stop, a most effective deterrent is provided against their passage through the mouth of the ditch.

It will thus be seen that I have provided a series of radially disposed rotor impelling devices which function not only as such, but which are freely spaced apart and open radially outwardly from their bases so as to effectively and directly cause splashing disturbances in the water without the defect of a surrounding envelop.

I interpose between the paddles a plurality of series or groups of radially projecting elements or prongs 6, one series being interposed between each pair of paddles, and the prongs 6 are preferably disposed in lines or rows which are radially parallel with the axis of the shaft 3. The prongs 6 will be positioned in relatively close relation with respect to each other although desirably in some considerable spaced relation with respect to adjacent paddles. I not only space the prongs in relatively close relation but I form the same of resilient wire or rods so that if a fish should happen to swim between a pair of prongs and feel the restraining action thereof, the fish could readily wiggle out of such restraint because of the yielding action of the prongs 6 thereby preventing the latter from carrying a wedged fish around beneath and through the stop. The prongs 6 are substantially radially disposed with respect to the hub 4 but they are curved so as to present concave faces toward the advancing stream whereby debris will seek to enter between the prongs and their adjacent paddles so as to engage the same laterally, and loosely because of the space therebetween, the rotating movement of the stop serving to carry the loosely grasped debris rearwardly and present an exit therefor on the aft side of the rotor stop. Thus should any debris enter between the paddles and prongs at $a$, such debris would be released at $b$ by the action of the passing current itself. Entrance of debris at any of the spaces between the prongs and the paddles, will be afforded and a gradually enlarging radially outward passage, aft of the rotor, under current action.

It will thus be seen that it would be almost impossible for the rotor to clog and thereby cause its rotation to be reduced or stopped, and dam the stream, because of the facility with which debris is engaged and released by the stop. However, if for any reason the rotor is prevented from rotating, the stream is in no way prevented from flowing in its normal way in that this device presents no positive dam for the same. As is obvious the prongs 6 afford little or no resistance and the propelling paddles 5 are of such size relative to the hub 4 that the stream can easily flow on either side of the said paddles.

It is believed that the novelty and utility of the invention will be clearly understood from the foregoing description and while I have herein shown and described one specific form of my invention, I do not wish to be limited thereto except for such limitations as the claim may import.

I claim:—

In combination, a flume and a fish stop mounted transversely of and in said flume, said fish stop comprising a rotatable hub, a plurality of prongs projecting from said hub and paddles positioned for engagement by the passing stream to rotate said hub, the said paddles being relatively narrow whereby to form a waterway at each side of the flume in any of the various positions of the paddles when said rotor is idle.

In testimony wherof I affix my signature in presence of two witnesses.

JULIUS H. DREHER.

Witnesses:
 LOUISE DEDERICH,
 JOS. F. DEDERICH.